Dec. 6, 1932.   R. E. ENOCHS ET AL   1,890,078
LIQUID MEASURING AND RECORDING MACHINE
Filed July 3, 1930   8 Sheets-Sheet 1

Inventors
R. E. Enochs
H. W. Lawrence
By Clarence A. O'Brien
Attorney

Dec. 6, 1932.    R. E. ENOCHS ET AL    1,890,078
LIQUID MEASURING AND RECORDING MACHINE
Filed July 3, 1930    8 Sheets-Sheet 4

Inventors
R. E. Enochs
H. W. Lawrence

By Clarence A. O'Brien
Attorney

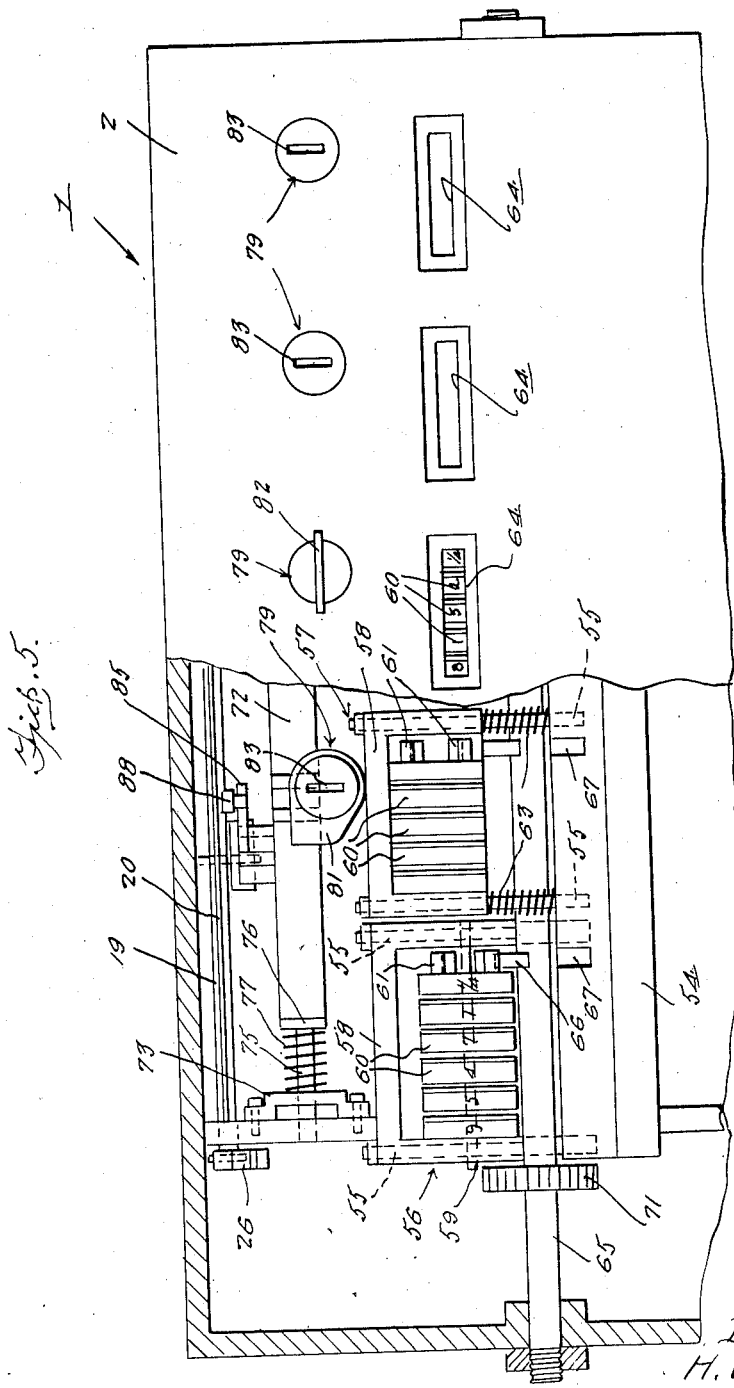

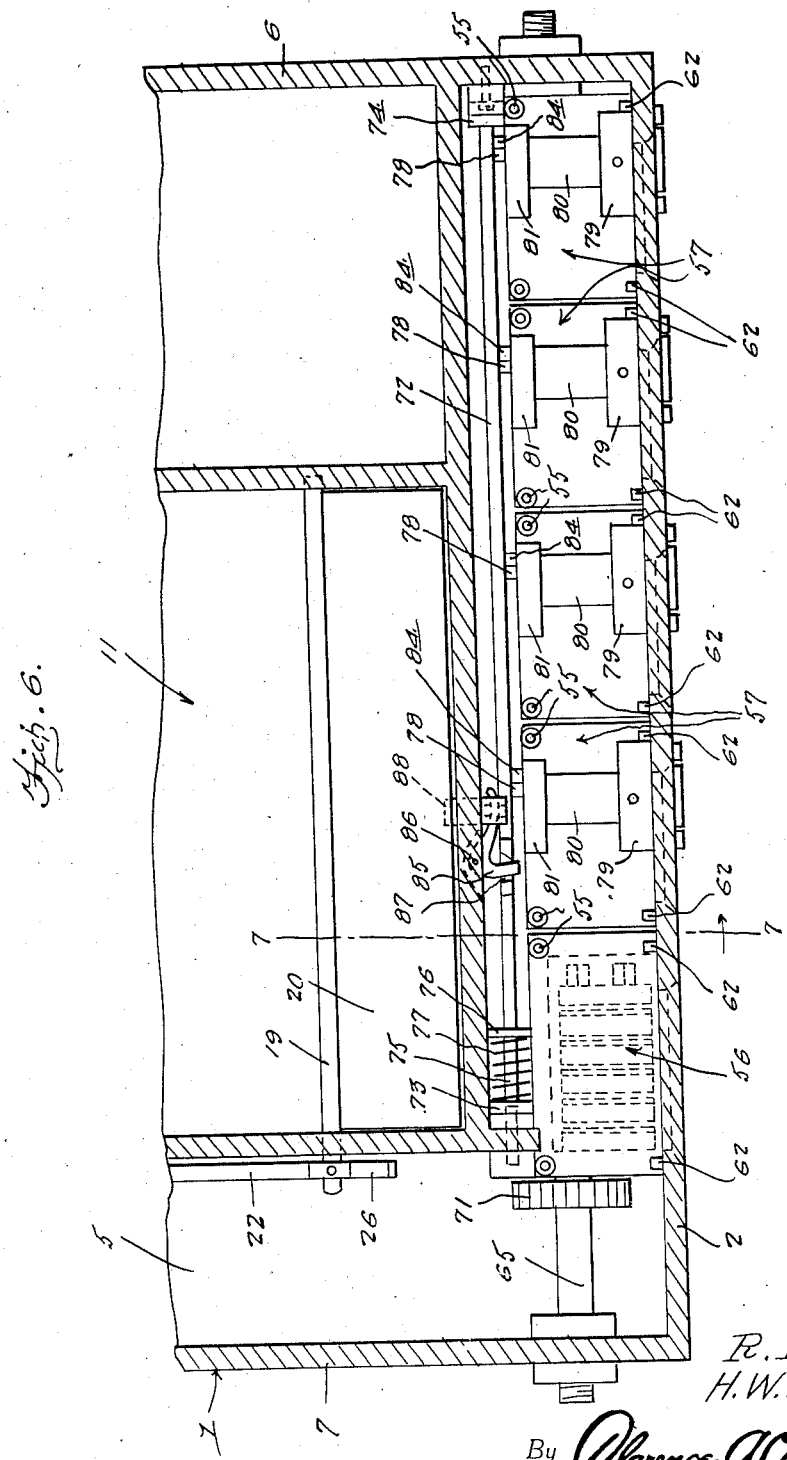

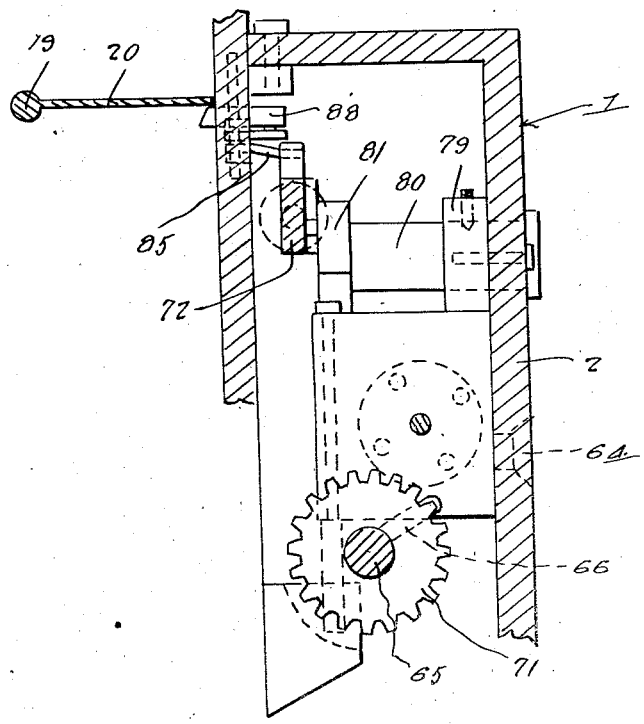

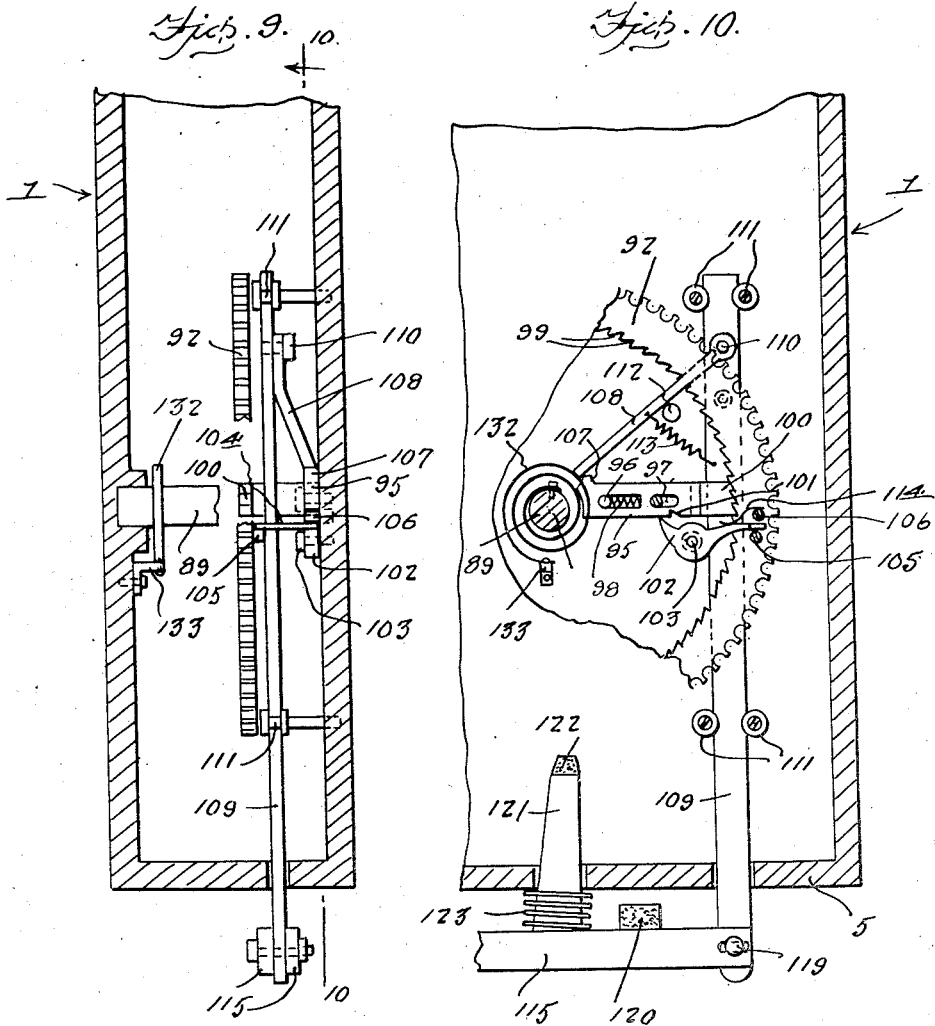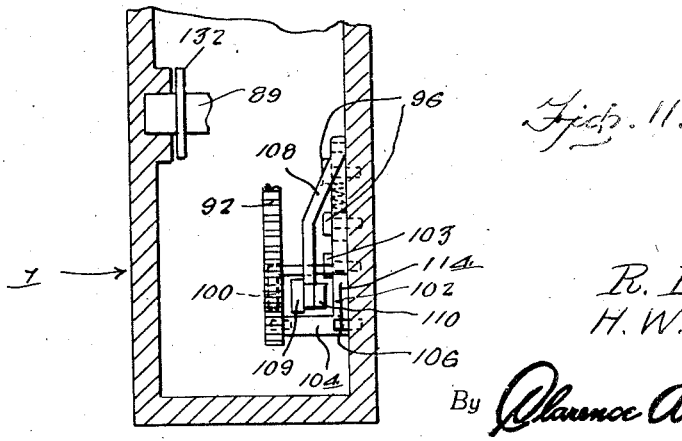

Patented Dec. 6, 1932

1,890,078

UNITED STATES PATENT OFFICE

ROBERT E. ENOCHS AND HARVY W. LAWRENCE, OF NATCHEZ, MISSISSIPPI

LIQUID MEASURING AND RECORDING MACHINE

Application filed July 3, 1930. Serial No. 465,674.

This invention relates to a liquid measuring and recording machine and more particularly to a device of this character which is adapted to be expeditiously connected to a gasoline or oil dispensing pump of the type usually found at automobile filling stations for measuring and recording the quantity of the gasoline or oil which is dispensed from said pumps.

An important object of the invention is to provide, in a manner as hereinafter set forth, a liquid measuring and recording means of the aforementioned character embodying means for recording the total quantity of liquid which is dispensed from the pump and further to provide means for keeping distinct record of the quantity of liquid dispensed from the pump by several operators or attendants.

Another important object of the invention is to provide a liquid measuring and recording machine of the character described embodying means whereby each customer may be provided with a printed record showing the quantity of liquid which has been placed in his automobile together with the cost of said liquid.

Other objects of the invention are to provide a liquid measuring and recording machine which will be comparatively simple in construction, strong, durable, highly efficient in its use and which may be manufactured at low cost.

Figure 1:
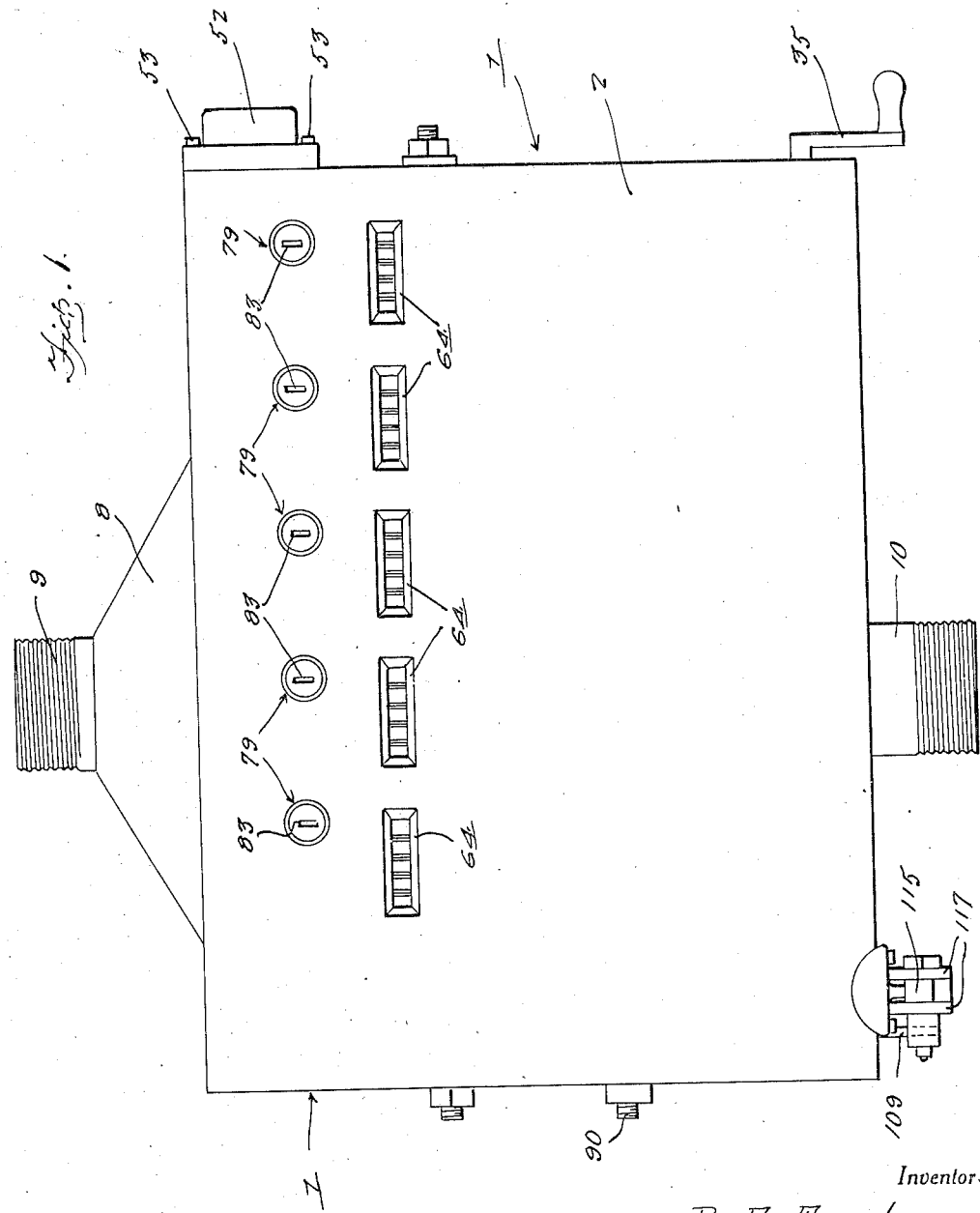
Figure 2:
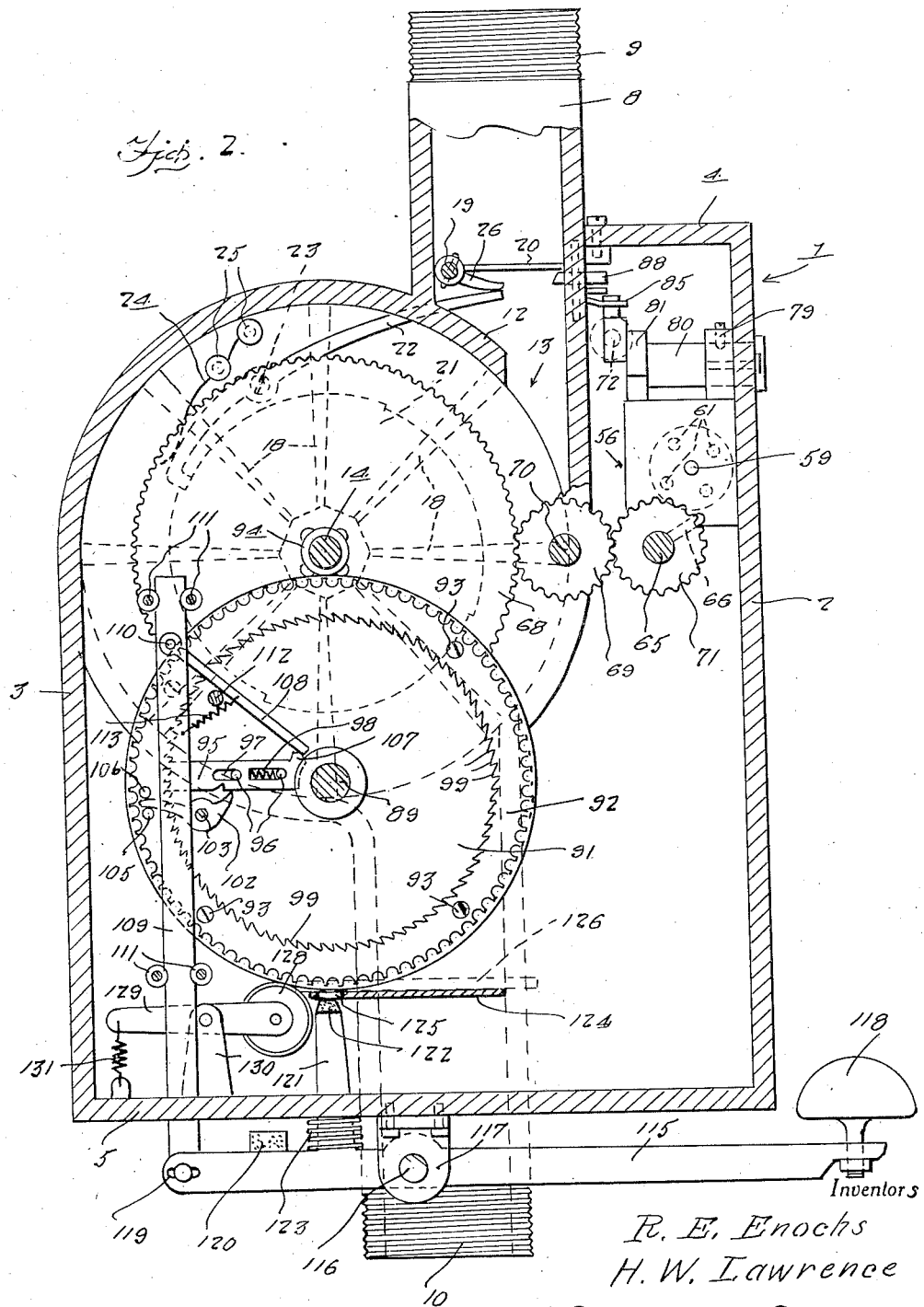
Figure 3:
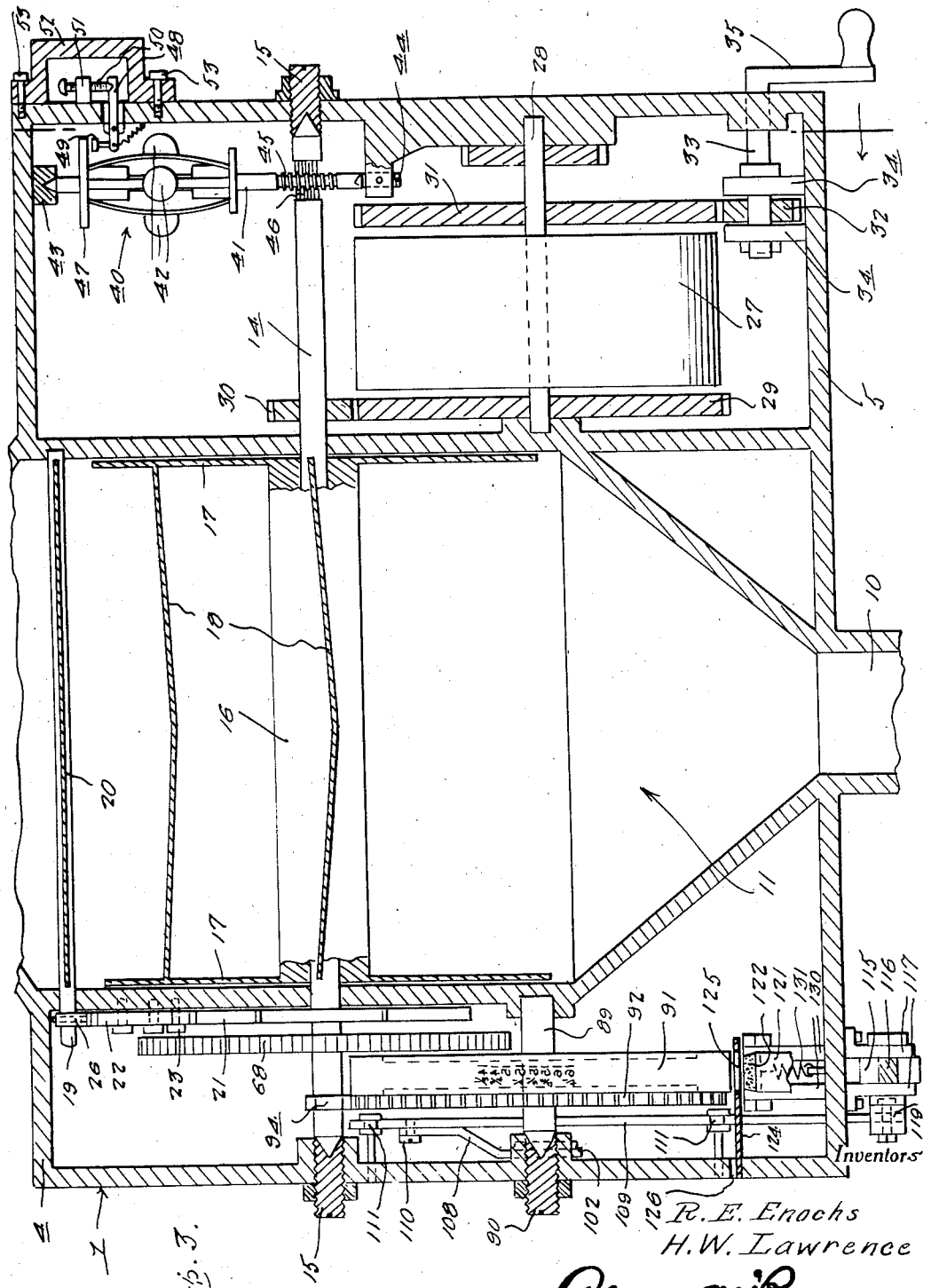
Figure 4:
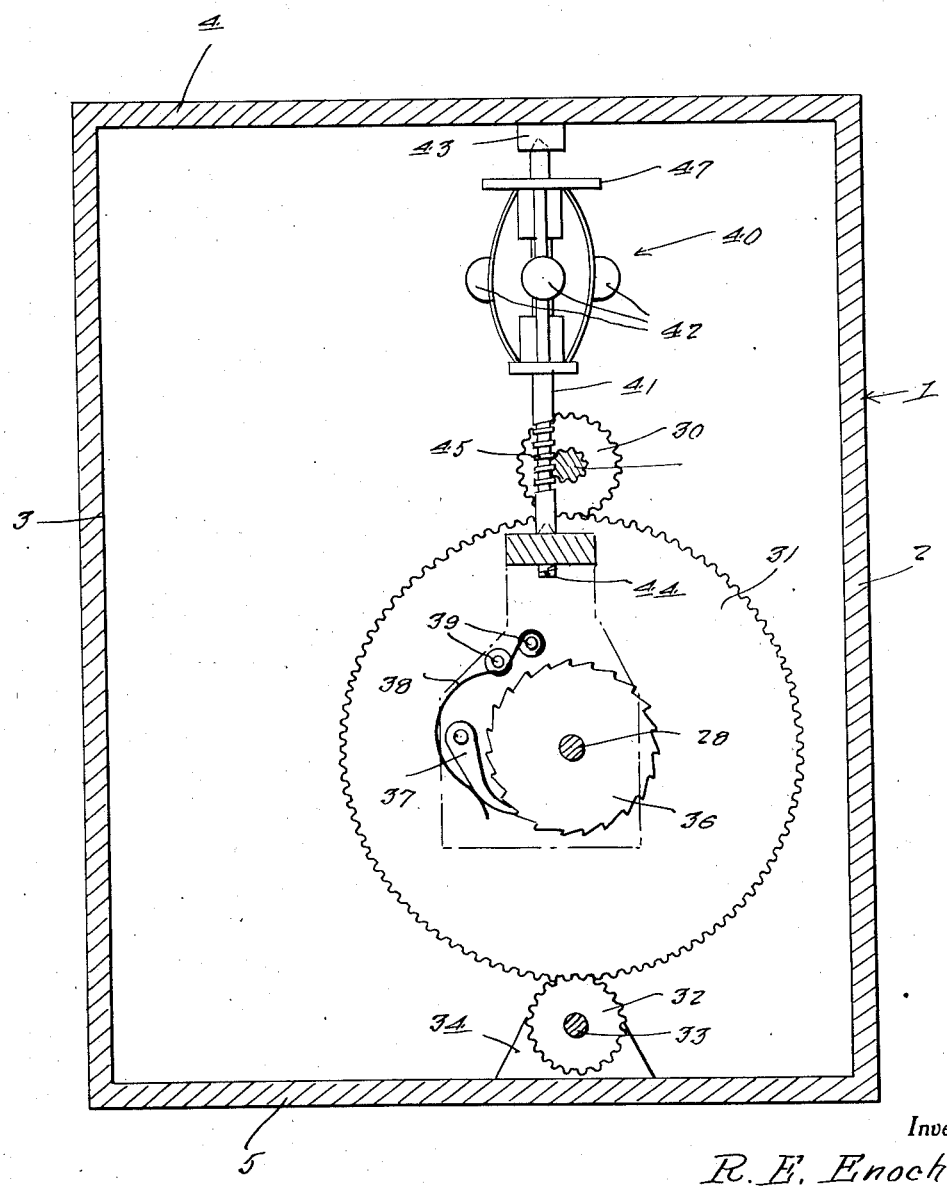

All of the foregoing and still further objects and advantages of the invention may become apparent from a study of the following specification, taken in connection with the accompanying drawings wherein like characters of reference designate corresponding parts throughout the several views, and wherein:

Figure 1 is a view in front elevation of a liquid measuring and recording machine constructed in accordance with this invention, Figure 2 is a vertical sectional view through the machine showing the card printing mechanism, Figure 3 is a vertical sectional view through the mechanism taken substantially at right angles to Figure 2, Figure 4 is a vertical sectional view taken at right angles to Figure 3 and showing the actuating and governor mechanism, Figure 5 is a fragmentary view partly in vertical section and partly in front elevation showing the upper portion of the machine in which the recording units are disposed, Figure 6 is a view in horizontal cross section showing the recording unit in top plan, Figure 7 is a detail view in vertical section taken substantially on the line 7—7 of Figure 6, Figure 8 is a plan view showing one of the cards which is given to each customer, Figure 9 is a detail view in vertical section showing the printing wheel locking and releasing mechanism, Figure 10 is a vertical sectional view taken substantially on the line 10—10 of Figure 9, Figure 11 is a horizontal cross sectional view showing certain of the elements illustrated in Figures 9 and 10.

Referring to the drawings in detail, it will be seen that the reference numeral 1 designates generally a housing of suitable size, configuration and material, said housing including the front wall 2, a rear wall 3, top and bottom walls 4 and 5 respectively and the side walls 6 and 7. The top wall 4 is provided with an intermediate raised portion 8 having formed thereon the threaded nipple 9 for coupling to the usual outlet of a liquid dispensing pump from which the usual delivery hose has been detached.

Depending from the lower wall 5 of the housing 1 is a threaded nipple 10 to which the delivery hose is to be coupled.

The housing 1 has formed therein a measuring chamber 11 into which the liquid passes at its upper end from the inlet 9 and from the lower end of which the liquid passes through the outlet 10. As seen in Figure 2, a lip 12 extends into the inlet 9 in a manner to provide somewhat restricted passage 13.

Mounted transversely in the housing and extending through the measuring compartment 11 thereof is a rotatable shaft 14 which is supported in the adjustable bearing 15. A measuring wheel 16 is fixed on the shaft 14 for rotation in the measuring compartment 11 and includes the end disks 17 between which extend the synclinal radiating plates 18 which provide a plurality of pockets of predetermined capacity. The measuring wheel 16 fits snugly in the compartment 11 in a manner to prevent leakage of the liquid therepast from the liquid inlet to the liquid outlet. The shape of the plates 18 assures the complete draining of each compartment when the device is in operation.

A rod 19 is journalled in the side walls of the measuring compartment 11 above the measuring wheel 16 and fixed on said rod 19 is a plate 20 which is adapted to be swung downwardly by the impact of the incoming liquid thereagainst when the locking means for said plate, which will be more fully hereinafter described, is in inoperative position.

Fixed on the shaft 14 for rotation therewith adjacent one side of the measuring compartment 11 is a ratchet disk 21 which is normally retained against rotation in one direction through the means of the pawl 22 which is pivotally mounted at 23 on the adjacent side wall of the measuring compartment 11. The pawl 22 is yieldingly maintained in engagement with the periphery of the ratchet disk 21 by the spring 24 mounted on the pins 25. A finger 26 is fixed on one end portion of the shaft 19 and is operatively engageable with the adjacent end of the pawl 22 in a manner to disengage said pawl from the ratchet disk 21 when the plate 20 is swung downwardly.

Mounted in the housing 1 adjacent the opposite side wall of the measuring compartment 11 is a conventional spring motor 27 which is operatively connected to the shaft 28 having fixed thereon a gear 29 which meshes with a gear 30 journalled on the shaft 14. It will thus be seen that the shaft 14 is adapted to be actuated by the spring motor 27. Also journalled on the shaft 28 is a gear 31 which is in mesh with a gear 32 fixed on the shaft 33 which is journalled in the bearings 34 and extends outwardly through the housing 1 and has fixed thereon a crank 35 for winding the motor 27. The gears 29 and 31 are provided with elongated hub portions 134 and 135, respectively, extending toward and terminating, at one end, adjacent each other. A disk 136 is journaled on the shaft 28 between the hubs 134 and 135 and said disk has mounted on its periphery an annulus 137. Springs (not shown) encircle the hub portions on opposite sides of the disk 136 and have one end connected to said hub portions and their other ends connected to the annulus 137. As best seen in Figures 3 and 4 of the drawings, a ratchet disk 36 is mounted on the outer end portion of the hub portion 135 and engaged with said ratchet disk 36 is a pivoted pawl 37 which is yieldingly maintained in engagement with the ratchet disk by the spring 38 mounted on the supporting pins 39. The ratchet disk 36 and the pawl 39 prevent unwinding of the spring motor 27 by retrograde rotation of the gear 31.

A centrifugal governor designated generally by the reference numeral 40, (see Figure 3) is mounted in the housing and includes a vertically disposed shaft 41 upon which the weights 42 are mounted in the usual manner. The shaft 41 is journalled for rotation in the bearings 43 and 44 provided therefor. The shaft 41 is further provided with a worm portion 45 which meshes with a worm portion 46 formed on the shaft 14. Thus, the governor 40 is operatively connected with the shaft 14. The governor 40 further includes disk 47 slidable on the shaft 41 and connected for actuation to the weights 42. A lever 48 is pivotally mounted for adjustment in the housing 1 and has mounted thereon a shoe 49 for frictional engagement with the disk 47. The lever 48 is rocked in a manner to adjust the shoe 49 relatively to the disk 47 through the medium of the screw 50 which is threaded through the ear 51 extending outwardly from the housing 1. A casing 52 is secured on the housing 1 by the bolts 53 in a manner to enclose the outer end portion of the lever 48 and the adjusting screw 50. It will thus be seen that when the pawl 22 is disengaged from the ratchet disk 21, the shaft 14 with the measuring wheel 16 thereon will be actuated by the spring motor 27. The speed of rotation of the shaft 14 and measuring wheel 16 will be controlled by the governor 40.

Referring now to Figures 5 and 6 of the drawings, it will be seen that a horizontally disposed platform 54 is disposed in the forward upper portion of the housing 1 and extends rearwardly from the front wall 2 of said housing. Pairs of upstanding pins 55 are mounted on the rear marginal portion of the platform 54. Rigidly mounted on one of the outermost pairs of pins 55 is a stationary master recording unit 56 and mounted for vertical sliding movement on the remaining pairs of the pins 55 are the supplemental recording units 57. It may be well to here state that the master recording unit 56 registers the total quantity of liquid which is dispensed from the pump and the supplemental recording units 57 are adapted to record the quantity of liquid which is disposed by individual attendants. Each of the recording units includes a housing 58 in which is journalled a shaft 59 upon which the graduated disks 60 are rotatably mounted. Projecting laterally from one of the end disks 60 of each recording unit is a plurality of lugs 61. Vertically disposed guide ribs 62 are mounted on the inner side of the front wall 2 of the housing 1 and disposed in grooves provided therefor in the casings 58 of each of the recording units. Coil springs 63 encircle the pins 55 of the slidable supplemental recording unit 57 for yieldingly urging said units upwardly on the said pins. The front wall 2 of the housing 1 has formed therein in front of each of the recording units a window 64. The master recording unit 56 may be observed at all times through its respective window but the supplemental recording unit 57 may be observed through their respective windows only when moved downwardly against the tension of the coil springs 63.

A shaft 65 is mounted for rotation in the housing 1 and is disposed beneath the recording units 56 and 57, said recording units being transversely alined as clearly seen in Figure 6 of the drawings. A series of pins 66 project from the shaft 65 for engagement with the lugs 61 of the recording units for the purpose of actuating said units upon rotation of the shaft 65. The master recording unit 56 is actuated at all times when the shaft 65 is rotating but the supplemental recording unites 57 are actuated only when in lowered position by their respective pins 66, the lugs 61 of said supplemental recording unit disposed out of the path of their respective operating pins when supplemental recording units are in raised position. Recesses 67 are formed in the platform 54 for the passage of the pins 66 when the shaft 65 is rotating.

Referring now to Figures 2 and 3 of the drawings, it will be seen that a gear 68 is fixed on the shaft 14 adjacent the ratchet disk 21 and said gear 68 is in mesh with an intermediate gear 69 mounted for rotation through the medium of the shaft 70. The gear 69 is, in turn, in mesh with a gear 71 fixed on the shaft 65. It will thus be seen that upon rotation of the measuring wheel 16 and the shaft 14 the shaft 65 will be actuated to operate the master recording unit 56 and any of the supplemental recording units 57 which may be in lowered position.

A bar 72 is mounted for transverse sliding movement in the housing 1 adjacent the recording unit and above the horizontal plane thereof. The bar 72 has its opposite ends slidably disposed in the brackets 73 and 74 which are provided therefor. The bar 72 is further provided with a reduced end portion 75 upon which is mounted a collar 76. Said reduced end portion 75 is slidable through an opening provided therefor in the adjacent wall portion of the housing upon which the bracket 73 is mounted.

A coil spring 77 encircles the reduced end portion 75 of the bar 72 and has one end impinged on the bracket 73 and its opposite end impinged on the collar 76 for yieldingly retaining the bar 72 in inoperative position. Mounted on the forward side of the bar 72 in spaced relation are the lugs 78, one of said lugs being provided for each of the supplemental recording units 57. A series of cylinder locks 79 are supported in the front wall 2 of the housing 1 above the supplemental recording units 57 and fixed on the rotatable barrels 80 of said locks are the cams 81 which are operatively engaged with the respective supplemental recording units 57 in a manner to depress same against the tension of the coil springs 63 upon actuation of the barrels 80. A key 82 (see Figure 5) is provided for each attendant and insertable through the slots 83 of the locks 79 for actuating same. Fixed on the inner side of each of the cams 81 is a lug 84 which is engageable with the adjacent lug 78 on the bar 72 in a manner to slide said bar against the tension of the coil spring 77 upon rotation of the cams.

A bell crank lever 85 is pivotally mounted as at 86 in the housing and has one end engaged in an opening 87 provided therefor in the slidable bar 72. The opposite end of the bell crank lever 85 is operatively connected to a slidable keeper 88 which extends into the inlet passage of the machine and is engageable beneath the plate 20 in a manner to maintain said plate in raised position, as best seen in Figure 2. It will thus be seen that upon actuation of any of the locks 79 the keeper 88 will be disengaged from the plate 20 in a manner to release said plate 20.

A counter shaft 89 (Figures 2 and 3) is rotatably mounted in the housing 1 and has one end supported in the adjustable bearing 90 and its opposite end supported in the adjacent wall of the measuring compartment 11. Fixed on the shaft 89 is a printing wheel 91 having raised type on its periphery, as best seen in Figure 3. A ring gear 92 is secured on one side of the printing wheel 91 by suitable elements such as screws 93. The ring gear 92 is of slightly less diameter than the printing wheel 91 and the outer periphery of said ring gear is operatively engaged by a star gear 94 fixed on the shaft 14. A pawl 95 is slidably mounted in the housing through the medium of the headed pins 96 which extend inwardly from an adjacent vertical wall of the housing and are disposed through the slots 97 provided therefor, in the pawl 95.

A coil spring 98 is disposed in one of the slots 97 and engaged with the pawl 95 in a manner to yieldingly engage said pawl with the ratchet teeth 99 on the inner periphery of the ring gear 92. It should be here stated that the slidable pawl 95 is provided with a laterally offset portion which is disposed within the ring gear 92 and designated by the reference numeral 100 in Figures 9 to 11 inclusive of the drawings.

The slidable pawl 95 is further provided in its lower edge and at an intermediate portion with a notch 101 for the reception of a dog 102 which is mounted on the pivot pin 103 extending inwardly from an adjacent wall of the housing 1. As best seen in Figures 9 and 11 the dog 102 is provided with an angular tail portion 104 the free end of which is adapted for engagement by a stop pin 105 projecting laterally from the adjacent side of the ring gear 92. Swinging movement of the dog 102 in one direction is limited by the pin 106 disposed thereabove for engagement therewith in the housing 1. Formed integrally on the upper side of the inner end portion of the slidable pawl 95 is an abutment 107 for engagement by the free end of the pawl operating rod 108 which is pivotally connected for swinging movement to the vertically shiftable bar 109 as at 110. The bar 109 is shiftable between the pairs of guide rollers 111 provided therefor in the housing 1. A stationary bar 112 extends transversely beneath the pawl operating rod 108 and said pawl operating rod 108 is urged toward the bar 112 by the coil spring 113 connected to said rod 108 and the shiftable bar 109. It may be well to here mention that a spring 114 is mounted on the stop pin 106 and engaged with the dog 102 in a manner to maintain said dog in engagement with the slidable pawl 95 at all times.

An operating lever 115 has an intermediate portion pivotally mounted on the pin 116 in the bearings 117 (Figures 2 and 3) beneath the housing 1 and mounted on the forward end portion of said lever 115 is a suitable knob 118. The opposite end of the lever 115 is pivotally connected to the lower end portion of the bar 109 by the pin and slot connection 119. A resilient bumper 120 is mounted on the rear portion of the lever 115 for abutting engagement with the bottom of the housing 1. A post 121 is mounted on a rear portion of the lever 115 and extends upwardly and slidably into the housing 1 beneath the printing wheel 91 and has mounted on its upper end a pad 122.

A coil spring 123 encircles the post 121 between the housing and the lever 115 in a manner to yieldingly urge said lever toward its inoperative position. A card supporting plate 124 is disposed horizontally between the printing wheel 91 and the post 121 and is provided with an opening 125 for the passage of the pad 122 and the upper end portion of said post 121. A slot 126 is provided in an adjacent wall of the housing 1 through which a card 127 (see Figure 8) is inserted and disposed on the plate 124 in position beneath the printing wheel 91.

An inking roller 128 is journalled for rotation on one end portion of a rockable bar 129 which is pivotally supported on the upstanding ear 130 in the housing 1. A coil spring 131 is connected to the opposite end of the bar 129 in a manner to yieldingly engage the inking roller 128 with the periphery of the printing wheel 91.

Referring again to Figures 9 and 10 it will be seen that a suitable spring 132 encircles the shaft 89 and has one end anchored thereto and its opposite end anchored to a bracket 133 provided therefor on the adjacent wall of the housing 1.

As clearly illustrated in Figure 8 of the drawings, the card 127 has printed thereon a table whereby the price of various quantities of the liquid purchased may be expeditiously determined by the customer. This table, as will be seen, has indicia furnished thereon whereby fractions of gallons as well as full gallons are given, as well as any other desired printed matter, such as the price per gallon. For example, if five and three fourth gallons have been placed in a customer's car and the price is twenty cents per gallon, the customer traces down the column which denotes gallons to the correct figure and then reads transversely to the column beneath the correct heading and he will find printed therein the total cost of the quantity of liquid purchases.

In use, the attendant inserts his key in the lock 79 of the supplemental recording unit for which his particular key is adapted and, as before explained, upon rotation of the lock the registering unit is depressed and the keeper 88 disengaged. The liquid is then caused to enter the machine and engages and depresses the plate 20 and the pawl 22 is disengaged from the ratchet disk 21 against the tension of the spring 24 through the medium of the finger 26 fixed on the shaft 19.

When the pawl 22 is disengaged from the friction disk 21, the shaft 14 and measuring wheel 16 thereon are rotated by the spring motor 27. The speed of rotation, as before explained, is governed by the governor 40. Each of the compartments in the measuring wheel has a predetermined capacity. In the present instance the capacity of each compartment in the measuring wheel is one pint and eight of the compartments are provided. It will thus be seen that with one complete revolution of the measuring wheel a gallon of the liquid will be metered.

The rotation of the shaft 14 actuates the shaft 65 of the registering units through the medium of the gears 68, 69 and 71. As before explained, the master registering unit 56 is actuated at all times by its respective lug 66 when the shaft 65 is rotated but only the supplemental recording unit 57 which has been depressed is operated by the shaft 65. The printing wheel 91 is driven by the shaft 14 through the star gear 94 and the ring gear 92 which is fixed on said printing wheel. The printing wheel 91 is rotated in a counter clockwise direction (clockwise in Fig. 10) and winds the springs 132. When the liquid ceases to flow into the machine the spring 24 again engages the pawl 22 with the ratchet disk 21 and the plate 20 is swung upwardly to its raised position. The pawl 22 locks the shaft 14 against the rotation. The abutments on the ratchet disk 21 correspond to the number of teeth or lugs on the star gear 94 and are so disposed relatively to the teeth on said star gear that the shaft 14 will always be stopped at a point where the teeth of the star gear are disengaged from the teeth on the outer periphery of the ring gear 92. When the machine is thus brought to a stop, reverse movement of the printing wheel 91 under the impulse of the spring 132 is prevented by the slidable pawl 95 which is engaged with the ratchet teeth on the inner periphery of the ring gear 92 by the spring 98.

At this time the pawl actuating rod 108 is disposed in the position seen in Figure 2 with respect to the lug 107 on the slidable pawl 95. The operator then inserts a card 127 between the printing wheel 91 and the pad 122 through the slot 126 and on the plate 124.

The attendant then actuates the lever 115 in a manner to move the post 121 upwardly through the opening 125 of the plate 124 and press the card against the character on the printing wheel 91 which has been moved into position. This movement of the lever 115 raises the bar 109 between the guide rollers 111 and the lower end of the rod 108 is swung toward the bar 109 in a manner to engage against the other side of the lug 107. When pressure on the lever 115 is removed it is returned to inoperative position by the coil spring 123 and the bar 109 is, of course, moved downwardly.

Upon downward movement of the bar 109 the rod 108 will move the slidable pawl 95 out of engagement with the ratchet teeth on the inner periphery of the ring gear 92, thus releasing said ring gear and permitting the printing wheel 91 to be returned to its original position by the spring 132. When the slidable pawl 95 is moved to disengaged position, said slidable pawl is retained in this position through the medium of the dog 102 which engages in the notch 101. A continued downward movement of the bar 109 engages an intermediate portion of the rod 108 on the shaft 112 with the result that the free end of said rod 108 is swung upwardly out of operative engagement with the lug 107.

The pawl 95 is retained in disengaged position with respect to the ring gear 92 by the dog 102 until the printing wheel 91 reaches its original position when the lug 105 engages the tail portion 104 of the dog and causes the disengagement of said dog from the slidable pawl 95. The disengaging movement of the dog 102 is limited by the stop pin 106 disposed thereabove. As will be apparent, when the dog 102 is disengaged from the slidable pawl 95, said slidable pawl will be again engaged with the ratchet teeth on the ring gear 92 by the coil spring 98. The machine is then ready for another operation.

It is understood, of course, that the attendant reverses the rotation of the lock barrel 80 and removes the key and the coil spring 77 returns the bar 72 to its original position in a manner to project the keeper 88 beneath the plate 20 before the next metering operation.

While the device herein illustrated and described is particularly adapted for use in connection with the dispensing pumps of filling stations, it may obviously be used for metering and recording liquid from any source.

It is believed that the many advantages of a liquid measuring and recording machine constructed in accordance with this invention will be readily understood and although the preferred embodiment of the invention is as illustrated and described it is to be understood that changes in the details of construction may be had which will fall within the scope of the invention as claimed.

What is claimed is:

1. In combination, a rotary measuring wheel, a motor for actuating the wheel, material actuated locking means for releasably securing the wheel against rotation, and a printing unit operatively connected with the wheel for operation in unison therewith.

2. In combination, a rotary shaft, a motor for rotating the shaft, a fluid measuring wheel fixed on the shaft for rotation therewith, a printing unit operatively connected to the shaft for actuation thereby in unison with the wheel, latching means for releasably securing the shaft against rotation, and fluid actuated means engageable with the latching means for shifting same to inoperative position.

3. In combination, a rotary shaft, means for rotating the shaft, a fluid measuring wheel fixed on the shaft for rotation therewith, latching means for releasably securing the shaft against rotation, fluid actuated means engaged with the latching means for shifting same to inoperative position, registering units selectively connectible with the shaft for actuation thereby, key controlled means for connecting each of the registering units with the shaft, and locking means, for securing the fluid actuated means in inoperative position, operatively connected with the key controlled means for shifting said locking means to inoperative position when one of the registering units is connected to the shaft.

4. In combination, a rotary fluid measuring wheel, means for actuating the wheel, fluid actuated means for releasably securing the wheel against rotation, shiftable registering units selectively connectible with the wheel for operation in unison therewith, means for shifting the registering units for operatively connecting same with the wheel and means operatively connected with the last named means for releasably securing the fluid actuated means in inoperative position.

5. A liquid measuring and recording machine comprising a rotary shaft, means for rotating the shaft, speed responsive means for controlling the rotation of the shaft, a fluid measuring wheel fixed on the shaft for rotation therewith, a ratchet disk fixed on the shaft, a pawl pivotally mounted intermediate its end and having one end operatively engageable with the ratchet disk for releasably securing the shaft against rotation, resilient means yieldingly urging the pawl toward its operative position, fluid actuated means operatively engaged with the other end portion of the pawl for actuating said pawl to its inoperative position, and locking means for releasably securing the fluid actuated means in inoperative position.

In testimony whereof we affix our signatures.

ROBERT E. ENOCHS.
HARVY W. LAWRENCE.